United States Patent [19]

Tachi

[11] 4,139,870
[45] Feb. 13, 1979

[54] CIRCUIT FOR DEMODULATING A PULSE WIDTH MODULATED SIGNAL

[75] Inventor: Katsuichi Tachi, Kawasaki, Japan

[73] Assignee: Sony Corporation, Tokyo, Japan

[21] Appl. No.: 777,632

[22] Filed: Mar. 15, 1977

[30] Foreign Application Priority Data

Mar. 18, 1976 [JP] Japan .................................. 51-29567

[51] Int. Cl.² .......................... G11B 5/09; G11B 15/18
[52] U.S. Cl. .......................................... 360/43; 360/72
[58] Field of Search .................................... 360/43, 72

[56] References Cited

U.S. PATENT DOCUMENTS

| | | | |
|---|---|---|---|
| 3,947,662 | 3/1976 | Vinal | 360/43 |
| 4,012,786 | 3/1977 | McKie et al. | 360/43 |
| 4,040,100 | 8/1977 | Chan | 360/43 |

Primary Examiner—Vincent P. Canney
Attorney, Agent, or Firm—Lewis H. Eslinger; Alvin Sinderbrand

[57] ABSTRACT

In a video tape recorder having a tape on which are recorded "0" and "1" binary coded bits of a pulse width modulated signal as for identifying frames of a video signal also recorded on the tape, the tape being advanced past a head detecting the pulse width modulated signal at speeds variable with the fast forward, normal and slow motion mode of operation of the recorder so as to change the bit frequency of the pulse width modulated signal in correspondence with the speed of the tape, a circuit which demodulates the "0" and "1" bits of the detected pulse width modulated signal by comparing the coded pulse width of each succeeding bit ($B_i+1$) with the width of the preceeding bit ($B_i$) to make the demodulation substantially independent of the bit frequency and the corresponding speed of the tape so that the circuit operates in each mode of recorder operation. In the preferred embodiment of the circuit, each bit is quantized into periodic pulses which correspond in number to the width of the bit. The number of pulses corresponding to the pulse widths of successive bits are then digitally compared in a comparator to obtain a two-level discrimination signal. More particularly, only selected higher value digits of the pulse numbers are compared to simplify the comparison and the comparator changes the level of the discrimination signal only during a preselected portion of each bit relative to the preceeding bit to assure accurate demodulation. The preferred circuit also has a circuit for deriving an edge pulse signal from the coded pulse width of each bit and a logic circuit operating on the edge pulse signal and the discrimination signal from the comparator for providing a signal corresponding only to bits of the one value, for example the "1" bits.

11 Claims, 4 Drawing Figures

CIRCUIT FOR DEMODULATING A PULSE WIDTH MODULATED SIGNAL

FIELD OF THE INVENTION

This invention relates to a circuit for demodulating "0" and "1" bits of a pulse width modulated binary coded signal by comparing the coded pulse width of a succeeding signal bit with the period of a preceeding bit, and more particularly, to such a circuit demodulating a binary coded pulse width modulated signal recorded on video tape to identify frames of the video signal to make the demodulation substantially independent of the bit frequency and corresponding speed of the tape which vary with the mode of operation of the video recorder.

DESCRIPTION OF THE PRIOR ART

It has been proposed to arrange successive tracks of signals recorded on magnetic tape for a video tape recorder obliquely of the longitudnal axis of the tape so as to be detected by a rotary head. Two successive oblique tracks carry the signal for each frame of the video picture. Other signals are recorded in tracks parallel to marginal portions of the tape to be detected by a fixed head. One track carries an audio signal, another track carries a control signal, and a third track carries a signal coded to indicate the absolute address of each frame of the video signal recorded on the oblique tracks.

The Society of Motion Picture and Television Engineers (SMPTE) has approved a signal code for identifying the frames of the video signal as may be recorded along one of the tracks which is parailel to the edge of the tape. The approved signal for identifying each frame comprises 80 periodic signal bits with 32 bits assigned to a time code, 32 bits assigned to a user identification signal, and 16 bits assigned to a synchronizing word. The 16 bits of the synchronizing word are arranged at one end of the signal which identifies each frame and the 64 bits of time code and user identification alternate in succeeding 4-bit portions thereafter.

Each bit of the SMPTE frame identification signal is representative of pulse width modulated binary signal codes with which the invention operates. Other pulse width modulation codes may also be used.

When a video tape is played back, the speed of the tape relative to the tape reading head may vary. For example, the tape may be moved at a speed corresponding to a fast forward mode, a fast rewind mode, a normal playback mode, or a slow motion mode. In addition, the speed of the tape may vary with the diameter of the tape as it unwinds from a tape storage reel. When the speed of the tape varies, the real time of the pulse widths or bit frequency of bits of a pulse width modulated signal read from the tape will also vary. Demodulating a pulse width modulated signal recorded on video tape may therefore require coordination between the tape playback speed and the demodulation device.

Coordinating tape playback speed and the signal demodulation circuitry is difficult. Each mode of tape playback speed would require a way of adapting the demodulation circuit to the tape playback speed. In addition, a way of relating tape speed variation from the diameter of tape wound on the storage reel would also be required.

It is desirable, however, to be able to demodulate a pulse width modulated code during any mode of operation of a video tape recorder. With the SMPTE approved frame identification signal, for example, a specific frame selected by its identification code could then be indexed in any mode of recorder operation.

OBJECTS AND SUMMARY OF THE INVENTION

Accordingly it is an object of the invention to provide a circuit for demodulating a pulse width modulated binary signal code which is substantially independent of the bit frequency of the coded signal so that, in its preferred use, the operation of the demodulation circuit is substantially independent of the playback speed of a video tape on which the pulse width modulated signal code has been recorded.

More particularly, it is a further object of the invention to provide a circuit which demodulates a pulse width modulated binary signal code by comparing the pulse widths of successive bits of the coded signal.

It is still a further object of the invention to provide a particular circuit for demodulating a pulse width modulated binary signal code by quantizing successive bits of the pulse width modulated signal to form a pulse number modulated signal (hereafter a PCM signal) and then comparing at least selected upper value digits of the number of PCM pulses to demodulate "0" and "1" bits of the pulse width modulated signal.

In accordance with an aspect of this invention in combination with a video tape recorder having a head which detects "0" and "1" binary coded bits of a pulse width modulated signal recorded on the tape such as the SMPTE approved signal for identifying frames of a video signal also recorded on the tape, the invention provides a circuit which demodulates the pulse width modulated binary coded signal substantially independently of the speed of the tape relative to the head which determines the bit frequency of the pulse width modulated signal. The tape speed is changed in accordance with the mode of operation of the recorder. A fast forward mode, a fast rewind mode, a normal playback mode, and a slow motion mode, for example, may each have a different tape speed. Changes in the wound diameter of tape on a reel also change the tape speed. The invention therefore makes it possible to demodulate the pulse width modulated signal in any mode of video tape recorder operation, it being understood, however, that the invention is also useful in other devices in which the bit frequency of a pulse width modulated binary coded signal changes.

Changes in the bit frequency change the real time of the coded pulse widths. A long coded pulse width at a low bit frequency may then appear as a short coded pulse at a high bit frequency. Suitable compensation for the bit frequency is therefore required to demodulate the signal in real time. With the demodulation circuit of the invention, however, the coded pulse widths of successive bits are compared with each other. There is therefore no variation in the coded pulse widths from the bit frequency at any discrete bit frequency. In many instances, moreover, even acceleration of the bit frequency is sufficiently gradual to make the change in frequency between successive bits negligable. In a video tape recorder, for example, tape speed can only be changed gradually and the corresponding changes in bit frequency may then be accomodated within the design of the demodulation circuit. The demodulation circuit is therefore substantially independent of bit frequency.

In the preferred embodiment, the coded pulse widths of successive bits are compared digitally. The circuit first quantizes the pulse width modulation of each bit into a PCM signal. The number of pulses corresponding to each successive coded pulse width are then digitally compared to demodulate the signal. Inasmuch as digital devices are easily integrated, the digital comparison of the PCM signals for successive bits can be more easily carried out than direct comparison of successive coded pulse widths. The demodulation circuit is therefore well suited for demodulating pulse width coded signals on a video tape during any mode of operation of a video tape recorder.

The preferred demodulation circuit is further made more accurate by preselecting a range relative to the preceeding bit period during which demodulation is effective. A comparator which compares the pulse widths (as represented by the pulse numbers from the PCM signal in the preferred embodiment) provides an appropriate discrimination signal only during this range. A logic circuit then operates on the discrimination signal in combination with an edge pulse signal which indicates the end of the coded pulse width to produce a signal indicating that the coded pulse was of one value, for example a "1" bit. Spurious edge pulse signals will then not effect the demodulation. With the SMPTE approved frame identification signal, for example, the end of the coded pulse width which identifies a "1" bit occurs in the middle of the bit. The range during which the discrimination signal enables the logic circuit is then selected to extend on either side of the middle of the bit.

The above and other objects, features, and advantages of this invention will be apparent in the following detailed description of illustrative embodiments which is to be read in connection with the accompanying drawings.

DESCRIPTION OF THE PREFERRED EMBODIMENT

Figure 1:
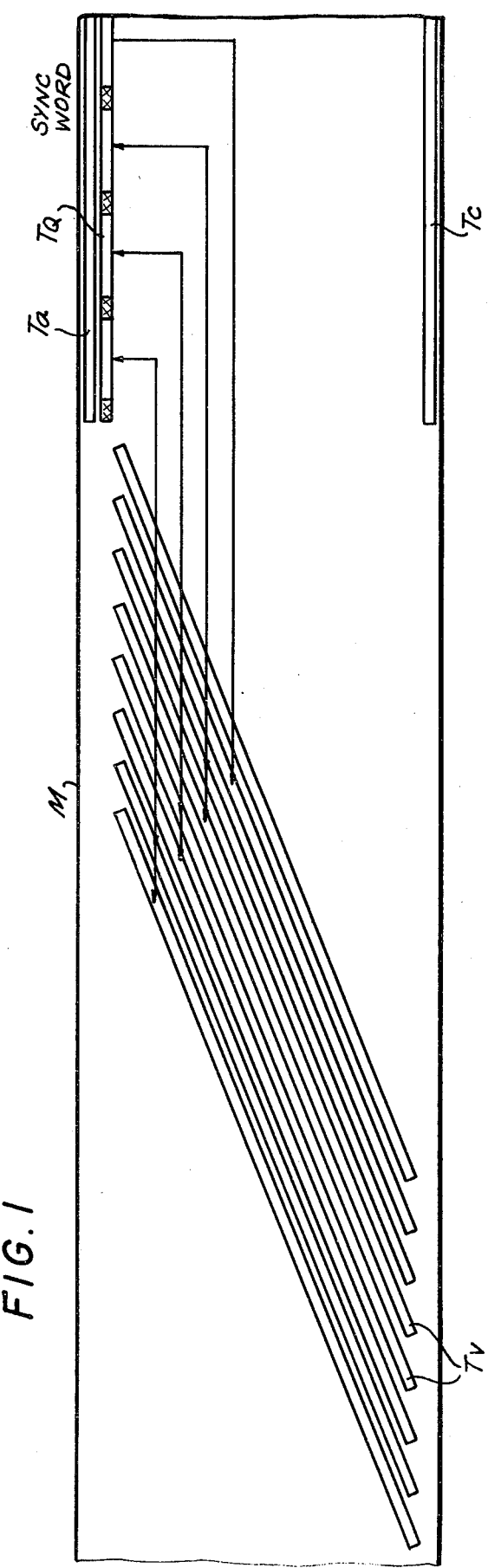
FIG. 1 is a schematic of signals recorded on magnetic tape.
Figure 2:
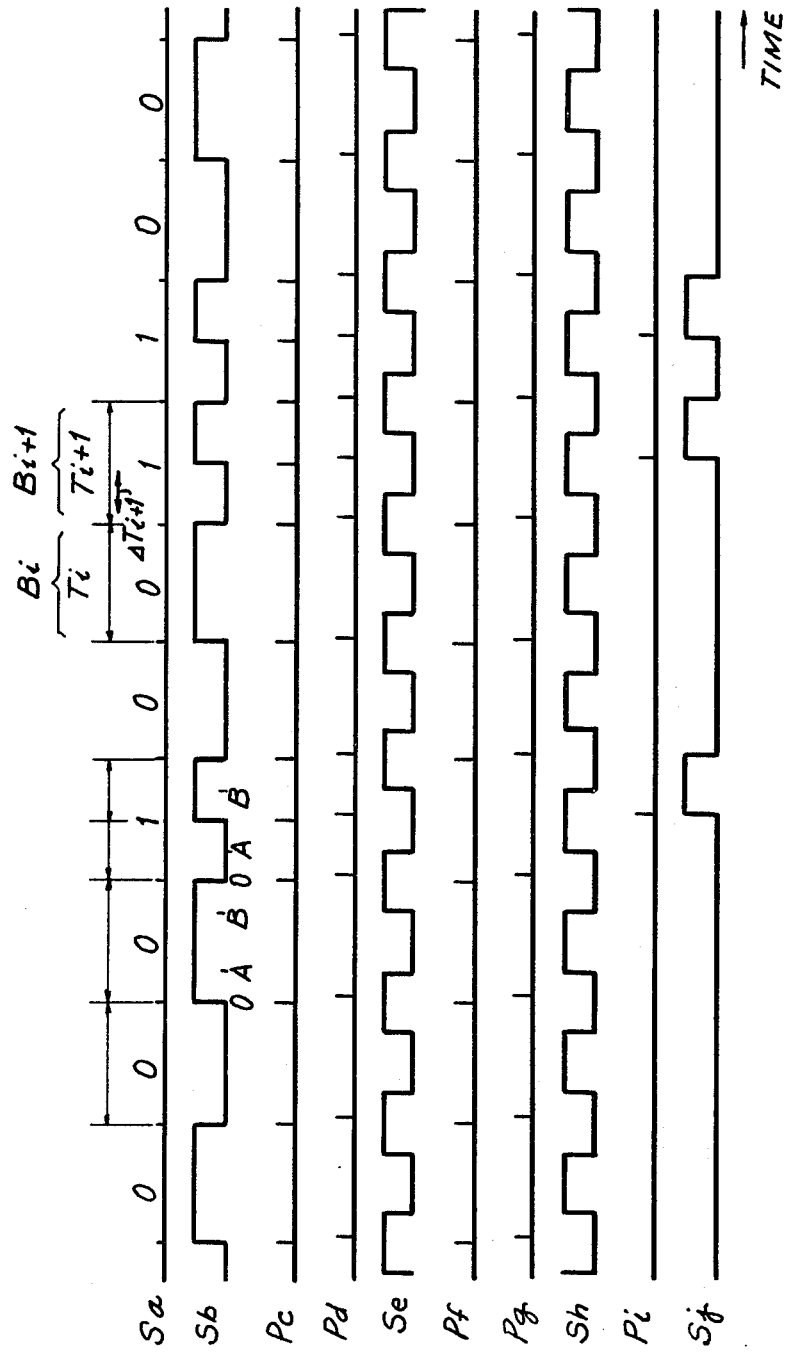
FIG. 2 is a time chart showing various signal wave forms in the preferred embodiment which correspond to an indicated binary coded pulse width modulated signal.

Line Sa of FIG. 2 represents selected binary values. A corresponding signal Sb which has been pulse width modulated into successive bits of binary coded information in accordance with the scheme approved by SMPTE for recording frame identification information on a video tape is also shown. Each bit has a level transition at the beginning of the bit and each bit coded to represent a "1" has a second level transition mid-way along the bit. A signal of the type Sb may thus be picked up from the frame identification track Tq on the video tape M shown in FIG. 1 as already described. Two successive oblique tracks Tv carry the video signal for each frame of the video picture. Track Ta carries the audio signal and track Tc carries a control signal.

Figure 3:
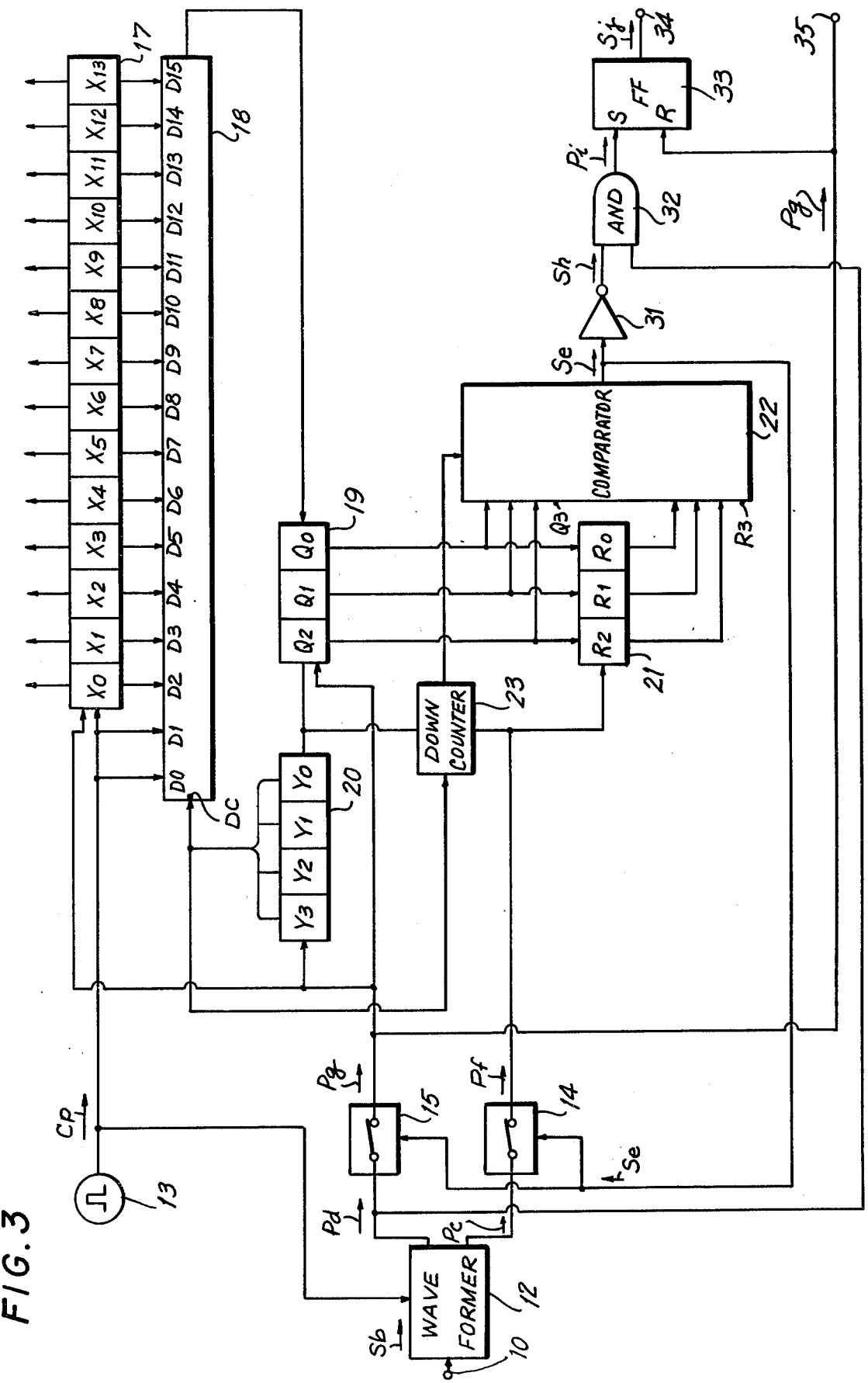
FIG. 3 is a schematic of the preferred embodiment.

As shown in FIG. 3, the signal Sb is provided from a terminal 10 of a detection circuit such as from the output of the tape pick-up portion (not shown) of a video tape recorder arranged to detect the signals on the track Tq (FIG. 1). A path from terminal 10 provides the pulse width modulated signal Sb to a wave former 12 which is also connected to receive clock pulses Cp from a clock pulse generator 13. The frequency of the clock pulses is substantially higher than the highest bit frequency of the pulse width modulated signal Sb on which the demodulation circuit is to operate, for example 8 times as high, so that the wave former 12 can respond with an edge pulse signal Pc to every level transition in the coded signal Sb in synchronism with one of the clock pulses Cp. The wave former also provides edge pulses Pd in correspondence with the pulses Pc, but slightly delayed in phase. The edge pulses Pc and Pd from the wave former (and other signals later to be described) are shown in FIG. 2.

The edge pulses Pc and Pd are supplied along respective paths to gates 14 and 15 which are both arranged to be controlled by a signal Se as later described. The gates 14 and 15 are shown schematically, it being understood that a variety of suitable relay and solid state gates are commercially available.

When the gates are properly enabled by the signal Se, each gate passes the corresponding input edge pulses Pc, Pd as pulses Pf and Pg. The pulses Pf correspond to the start of each bit of the coded signal Sb (the gate 14 having been disabled by the signal Se at the time of a pulse Pc which represents a level transition intermediate the beginning and end of a "1" bit as later described). Gate 15 similarly operates on the pulses Pd. In recognition of their later described function, the pulses Pf are sometimes referred to as latch pulses and the pulses Pg are sometimes referred to as reset pulses.

The clock pulses Cp from the clock generator 13 are also provided along a path to a counting input terminal of a fourteen power binary counter 17 of the type which is triggered by the trailing or negative going edge of each pulse. Suitable counters are commercially available. The counter 17 is shown schematically in FIG. 3 with X0 indicating the lowest digit stage of the counter and X13, the highest digit stage. The counter 17 also has a reset terminal which is connected to gate 15 to receive the reset pulse signals Pg. The counter 17 thus serves to count the number of clock pulses in the period between successive reset pulse signals Pg. Inasmuch as the signals Pg correspond to the beginning of every bit of the pulse width coded signal, the counter 17 is arranged to count the number of clock pulses Cp corresponding to each bit of the code signal Sb. Each bit of the signal Sb is thus quantized into a PCM signal. (Since frequency of the clock pulses is known, the number of PCM signal pulses counted for each bit also provide an indication of tape speed).

A data selector 18 has sixteen data signal input terminals D0 to D15. The first two terminals D0 and D1 are connected to the clock pulse generator 13 to receive the clock pulses Cp. The next 14 terminals D2 to D15 are connected respectively in parallel to digit stages X0 to X13 of the counter 17. The data selector also has a control terminal DC.

Figure 4:
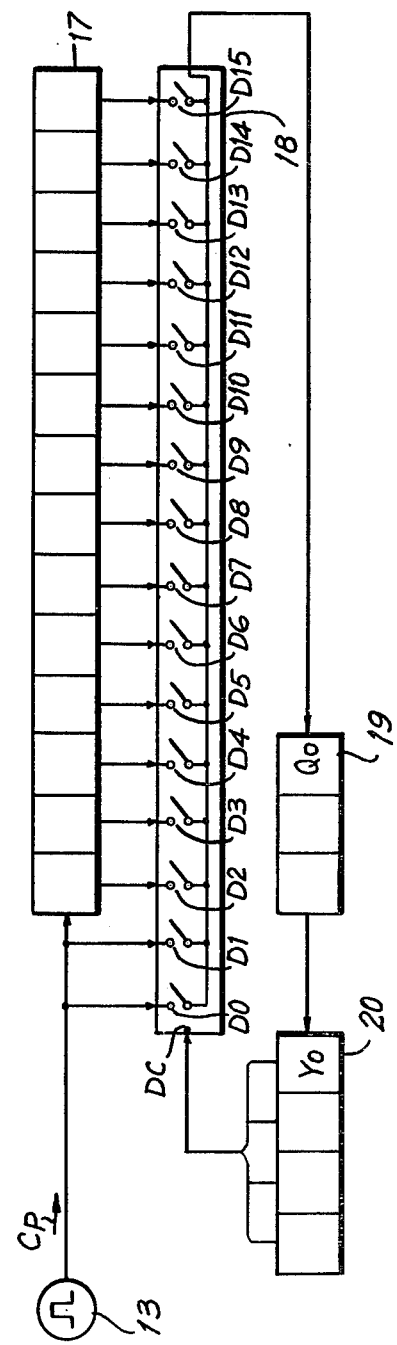
FIG. 4 is a more detailed schematic of a portion of the embodiment shown in FIG. 3.

FIG. 4 shows the data selector in further schematic detail. Each input terminal D0 to D15 is there shown to be gated to a common lead to another counter 19. The gates are sequentially enabled to connect the associated one of the terminals to the lead of counter 19 by successive "1" pulses at the control terminal DC. Only one gate is enabled at a time starting from the gate associated with the terminal D0. Thus, in the initial arrangement of the data selector as shown in FIG. 4, the clock pulses Cp from clock generator 13 are gated to the counter 19 through the gate associated with terminal D0. A "1" signal at terminal DC will then disable the gate associated with terminal D0 but enable the gate associated with terminal D1 so that the clock pulses are then provided to counter 19 via terminal D1. Successive "1" signals similarly sequence the other gates until an all "0" signal at terminal DC resets the data selector 18 to the condition shown in FIG. 4. Those in the art will recognize that a sequential data selector of the type described may be readily implemented.

Returning to FIG. 3, the counter 19 is seen to be a three bit counter having digit stages Q0 to Q2, Q0 being the lowest digit stage and Q2 being the highest digit stage. A terminal associated with the highest digit stage Q2 is connected to another counter 20 to provide an overflow signal from the highest digit stage Q2 of the counter 19 as an input signal to the counter 20. Both the counters 19 and 20, like counter 17, are of the type triggered by the trailing edge of an input pulse.

The counter 20 is a four bit counter having digit stages Y0 to Y3 with Y0 being the lowest digit stage. Each bit stage Y0 to Y3 of counter 20 is connected to the control signal terminal DC of the data selector 18 to provide the control signal.

Each of the 3 digit stages Q0 to Q2 of the counter 19 is also connected in parallel to corresponding digit stages R0 to R2 of a 3 digit stage shift register 21 and to input terminals of a comparator 22. Each of the digit stages R0 to R2 of register 21 are also connected to input terminals of comparator 22 so that, as later described, the comparator can compare the number stored in register 21 with the number then counting in counter 19.

The path which carries the overflow signal from counter 19 to counter 20 as already described is also connected to a counting input signal terminal of a downcounter 23. The downcounter 23 is also connected to each of the digit stages Y0 to Y3 of counter 20. The downcounter 23 and the shift register 21 are each also connected to receive the latch pulses Pf from gate 14 for presetting the downcounter to the number then in the digit stages Y0 to Y3 of counter 20 and the shift register to the number then in the digit stages Q0 to Q2 of counter 19.

A reset terminal on each of the counters 17, 19 and 20 is connected to gate 15 to receive the reset pulses Pg. The reset pulses reset each counter to an all "0" count. By recalling that the latch pulses Pf precede the reset pulses Pg slightly in phase, it will be understood that the count of counters 19 and 20 are preset in the register 21 and downcounter 23 just prior to resetting the counters 19 and 20.

A path carries an output signal Se from the comparator 22 to the gates 14 and 15 to control their operation. The path also carries the output signal Se from the comparator to an inverter 31. The inverter is connected to an input terminal of an AND gate 32 to provide the inverted signal Se, a signal Sh, to the AND gate. The AND gate 32 is also connected to the wave former 12 to receive the pulses Pd from the wave former. When an edge pulse signal Pd from the wave former 12 and a signal Sh from invertor 31 each enable the AND gate, the AND gate provides a signal Pi on an output path to the set terminal S of a flip-flop 33. A reset terminal R of flip-flop 33 is connected to gate 15 to receive the reset pulse signals Pg. As can now be described, the output signal Sj from the flip-flop 33 is provided at a terminal 34 of the flip-flop and represents each "1" bit of the pulse width modulated signal code Sb. A terminal 35 is connected to gate 15 and the signals Pg at terminal 35 represent every bit of the signal code to complete the demodulation.

OPERATION OF THE PREFERRED EMBODIMENT

When a level transition in the signal Sb and a clock pulse Cp from the clock generator 13 each enable the wave former 12, the wave former provides edge pulse output signals Pc and Pd, the edge pulse signal Pd being slightly delayed in phase relative to the edge pulse signal Pc. Assuming for now that the level transition in the signal Sb represents the beginning of a bit of the signal Sb, the signal Se enables the gates 14 and 15 so that the edge pulse signals Pc and Pd pass through the gates as the latch and reset pulse signals Pf and Pg, the signal Pg being slightly delayed in phase relative to the signal Pf in correspondence with the signals Pc and Pd.

The pulse Pg resets the counters 17, 19 and 20 so that each digit stage of each of the counters is zero. The zero setting of each digit stage of the counter 20 provides a zero control signal to the terminal DC of the data selector 18 so that the data selector has the switching arrangement shown schematically in FIG. 4.

The next clock pulse Cp from the clock generator 13 increments the counter 17 so that the first digit stage X0 becomes "1". The same first clock pulse is also provided to the input terminal D0 of the data selector 18 and, with the switching arrangement set as shown in FIG. 4, from the data selector 18 to the counter 19. The counter 19 is then also incremented to a "1" count in the first digit stage Q0.

The next clock pulses Cp continue to increment the counters 17 and 19 as just described until the highest digit stage Q2 of counter 19 overflows when the counter 19 increments from a count of "111" to a count of "000" with an overflow signal passing to the counter 20.

The Y0 digit stage of counter 20 then provides a "1" control signal to the control terminal DC of the data selector to change its enabled switching arrangement to the D1 terminal. The next clock pulse then increments the counter 17 to "1001" and the counter 19 to a "1" as before, but the clock pulse Cp passes through the D1 terminal of the data selector 18 to the counter 19 rather than through the D0 terminal as with the prior clock pulses. Further clock pulses then continue to increment the counters 17 and 19 until the highest digit stage Q2 of counter 19 again overflows to the counter 20.

The counter 20 then increments to a count of "10" in the Y1 and Y0 digit stages. The new "1" digit in the Y1 digit stage of counter 20 provides another control signal to the terminal DC of the data selector to again advance the data selector to the next input terminal D2.

The next clock pulse again increments the counter 17 as before. The counter 17, like counter 19, having just advanced to a higher digit stage is incremented by the clock pulse to a "1" in the X0 digit stage. This "1" signal is provided through terminal D2 of the data selector to counter 19. Counter 19, however, does not increment because, it will be recalled, counter 19 is of the trailing edge triggered type. Thus, it is only when the next clock pulse Cp increments the counter 17 to a "10" in the X1 and X0 digit stages that the trailing edge of the "1" digit from the X0 digit stage passes through the data selector terminal D2 to the counter 19 to increment counter 19. The data selector has thus now arranged counter 19 to count only every other clock pulse.

As every other clock pulse continues to increment counter 19, the counter will eventually overflow as before to provide another "1" signal in a digit stage of the counter 20. The corresponding "1" control signal from the counter 20 advances the data selector 18 to now connect the X1 digit stage to counter 19. The trailing edge of a "1" signal from the digit stage X1 of counter 17 occurs only every fourth clock pulse so that only every fourth clock pulse then increments counter 19 is similarity to the operation just described for counting every second pulse.

Each time counter 19 again fills and overflows into counter 20 to provide a new control signal to the terminal DC of data selector 18, the data selector progressively advances through its further digit stages. Each digit stage further reduces the frequency with which the clock pulses Cp are counted by the counter 19 by one half for each digit stage of the data selector 18. This operation, however, is analogous to that just described and, therefore, requires no further description. The operation just described thus continues until the next pulse Pg resets each of the counters 17, 19 and 20 at the beginning of the next bit.

The reset pulse signal Pg, however, is slightly delayed in phase from the corresponding latching pulse Pf. The immediately preceeding latching pulse Pf presets or latches the shift register 21 and the down counter 23 at the values then in their respectively connected counters 19 and 20. For example, each digit stage of the shift register 21 is connected to the corresponding digit stage of the counter 19 so that the latching pulse Pf sets the digit stages of the register 21 to values corresponding to those then in the counter 19. Similarly, the down counter 23 is connected to the counter 20 and, upon receiving the latch pulse Pf, is preset to the digit values in the counter 20. A quantized number of clock pulses corresponding to one bit ($B_i$) of the code signal Sb are then stored in the register 21 and down counter 23 for comparison to the next bit ($B_i+1$).

The level transition at the beginning of the next bit ($B_i+1$) of the signal Sb and the clock pulse from the clock pulse generator 13 trigger new signals Pc and Pd from the wave former 12 as described for the preceeding bit ($B_i$). The counting operation for quantizing the length of the succeeding bit ($B_i+1$) then continues as described for the preceeding bit with each clock pulse incrementing counter 17 and clock pulses selected by data selector 18 incrementing the counters 19 and 20 as just described. Inasmuch as the digit stages D2 to D15 of the data selector cooperate with the counter 17 to provide only a fraction of the clock pulses to counters 19 and 20, the number in counters 19 and 20 represent higher values of the total clock pulse number over the bit period.

The overflow "1" bits from the Q2 digit stage of counter 19, which increment the counter 20 as before described, are also provided to the down counter 23. The down counter decrements or counts down from its preset value for the $B_i$ bit for each of the "1" overflow bits during the $B_i+1$ bit and provides the current value of the count to the comparator 22. Inasmuch as each overflow from the highest digit stage Q2 of counter 19 increments the counter 20 and the value of the increment number from counter 20 has been stored in the down counter, the value of the number stored in the down counter at any time represents the number of times the counter 19 overflowed during the preceeding bit ($B_i$) which exceed the number of times the counter has overflowed during the succeeding bit ($B_i+1$) which is then being quantized in the counter 19. In other words, the number in the down counter 23 represents a corresponding shift to the right of the value of the digit stages of counter 19 as compared to the value of the digit stages in register 21.

For example, if during the preceeding bit ($B_i$) the counter 19 overflowed three times, a numeral three ("11" in binary form) would have been preset in the down counter by the latch pulse Pf just before the counters 19 and 20 were reset by the pulse Pg at the start of the next bit ($B_i+1$). When the first clock pulse increments the counter 19 during the succeeding bit ($B_i+1$) to a "1" in the Q0 digit stage, the value of the "1" in the Q0 digit stage would be less than the value of the R0 digit stage of the register 21 by the 3 digit places represented by the count in the down counter 23. The count in the down counter 23 is therefore provided to the comparator 22 to shift the value of the digit stages Q0 to Q2 from counter 19 relative to the digit stages R0 to R2 of the register 21 so that proper comparison of the relative values of the digit stages can be made in the comparator.

The comparator 22 determines the difference in the digit numbers from the preceeding bit ($B_i$) as stored in the register 21 with the digit number from the succeeding bit ($B_i+1$) as then in the counter 19 with correction for digit order from the number from down counter 23. When the number in counter 19 is within a predetermined range of the number in register 21 (after digit correction with the number from counter 23) the comparator provides a "0" discrimination signal Se, but when the values of the numbers in counter 19 and register 21 (after digit correction) are outside the preselected range, the comparator 22 provides a "1" discrimination signal Se.

It may be demonstrated that at all times after a number of clock pulses have been counted, the digit stages Q0 to Q2 of counter 19, correspond to the fourth to the penultimate digit stages in counter 17 which have been incremented by a clock pulse and the clock pulse frequency is set high enough to always reach this number. Moreover, the highest digit stage in counter 17 which has been incremented by a clock pulse is always a "1". The highest four digits in counter 17 then correspond to the number in digit stages Q0 to Q2 with an additional digit stage Q3 set to a "1". A "1" bit in the Q3 digit stage is therefore supplied in comparator 22 and, inasmuch as the digit stages R0 to R2 in register 21 correspond to the values in digit stages Q0 to Q2 for the preceeding bit, a "1" bit is also provided at an R3 digit stage in comparator 22.

Even without considering the actual operation of the counters, it is apparant that since the same quantizing operation has been performed on each succeeding bit, the counter 19 will reach the same number over each bit (when changes in bit frequency are ignored). Similarly, therefore, when counter 19 has a value half that stored in register 21, half the bit period of the succeeding bit ($B_i+1$) has elapsed relative to the period of the preceeding bit ($B_i$). The predetermined range during which the comparator provides the "0" discrimination signal therefore relates an interval within the succeeding bit ($B_i+1$) to an interval within the preceding bit ($B_i$).

The discrimination signals Se are inverted by inverter 31 so that the "0" Se signal within the preselected range becomes a "1" signal Sh from the inverter. The signals Sh are provided to one terminal of AND gate 32. Another terminal of AND gate 32 receives the edge pulse Pd signals.

The edge pulses Pd occur at each level transition in the signal Sb and a "1" bit in the signal Sb has a level transition midway during the bit. If, therefore, the preselected range during which the comparator 22 provides a "0" discrimination signal Se extends through the middle of a bit (when the count in counter 19 is half that in register 21), the corresponding "1" signal Sh will be present when the signal Pd corresponding to the midpoint level transition in a "1" bit arrives at AND gate 32. The AND gate is then enabled to provide a signal Pi to the set terminal S of flip-flop 33. Flip-flop 33 then changes state to provide the signal Sj at terminal 34 which designates a "1" bit of signal Sb. It is therefore apparant that a lower limit A of the preselected range and an upper limit B of the range must satisfy the condition:

$$A < 50\% < B$$

where the limits A and B are percents of the preceeding bit period.

The "0" signal Se during the preselected range then also disables the gates 14 and 15 so that no signals Pf and Pg corresponding to signals Pc and Pd are provided when the signals Pc and Pd represent a level transition in the middle of a "1" bit of signal Sb. The counters 17, 19 and 20 are thus not reset during a "1" bit. (Since there is no level transition during a "0" bit, the signals Pc and Pd only occur at the end of the bit.) The preselected range satisfying the condition:

$$A < 50\% < B$$

therefore assures that the counters 17, 19 and 20 are reset only at the end of each bit so as to quantize each full bit period.

The pulse Pg at the end of the bit then resets flip-flop 33. The flip-flop therefore provides a signal at terminal 34 from the mid-point of each "1" bit until the beginning of the next bit. The pulse Pg at the end of each bit is also provided to terminal 35. Since the signal at terminal 34 indicates each "1" bit and the signal at terminal 35 indicates every bit, the demodulation is complete.

It only remains, therefore, to establish the smallest value of the lower limit A of the preselected range which will permit proper demodulation. The smallest value is selected by considering errors in detecting the signal Sb such as drop out in reading the level transitions from a video tape.

If an extreme case is considered to be missing all level transitions in four successive "0" pulses, the quantized value stored in register 21 will be four times as large as it should be. If the lower limit A is then less than 25% of the period of the detected preceeding "bit" (four actual bits in this example) the comparator 22 will be within the preselected range when the end of the next (fifth) bit is detected and represented by a pulse Pd. The "0" discrimination signal will then disable gates 14 and 15 so that no corresponding pulses Pg and Pf will appear to reset and preset the counters and register as described. Demodulation of the next bit will then not occur.

If, however, the smallest value of the preselected range is greater than 25%, then the comparator will still be outside the range at the end of the next (fifth) bit after four missed bits. The corresponding "1" discrimination signal will then enable gates 14 and 15 to provide the pulses Pf and Pg for resetting and presetting the counters. Demodulation can then continue.

If more than four bits are missed, the end of the next bit will occur within less than 25% of the period of the missed bits. (One bit in n missed bits is less than 25% of the n missed bits when n is greater than four.) Setting the smallest value to greater than 25% of the period of the preceeding bit will then permit continued demodulation even if four or more successive bits are missed.

If fewer than four bits are missed, the end of the next bit will occur after more than 25% of the period of the preceeding missed bits. Demodulation would then not continue if the end of the next bit were in the preselected range and the succeeding bit is a "0" bit. If, however, the succeeding bit is a "1" bit with a level transition mid-way in the bit, the level transition mid-way in the bit will still be outside a range having a smallest value greater than 25% even if only one bit is missed. (One half or the middle of one bit is just 25% of the period of the two missed bits.) The mid-bit level transition in a "1" bit will then provide the signals Pf and Pg for resetting the counters.

In the SMPTE approved frame identification signal, the synchronizing word always has a plurality of successive "1" bits. It is therefore reasonable to assume that one of these "1" bits will occur after the period of any missed bits which have caused demodulation to discontinue. The smallest value of the lower limit A may therefore be set at greater than 25% of the preceeding bit period. Similar considerations suggest a highest value of the upper limit B as less than 75% of the preceeding bit period.

The values of the upper and lower limits have been set in this way without considering acceleration of the bit frequency between successive bits. It is clear from the way the values are determined, however, that an increase in the bit frequency of the succeeding bit ($B_i$+1) (a shorter bit period) relative to the preceeding bit ($B_i$) will permit the smallest value of the lower limit A to be decreased proportionally to the acceleration increase in the bit frequency because the end of a next accelerated bit after missed bits will arrive more quickly relative to longer periods of the slower missed bits. Similarly, deceleration (negative acceleration) will require a proportional increase in the lower limit A and acceleration will oppositely affect the upper limit B.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A circuit for demodulating "0" and "1" bits of a pulse width modulated binary coded signal having a level transition at the end of each coded pulse width, the circuit comprising:
   a circuit responsive to the level transition at the end of each coded pulse width for providing a corresponding edge pulse signal;

a circuit for quantizing each bit of the pulse width modulated signal into a pulse number modulated signal, said quantizing circuit including a generator of clock pulses, a first binary counter connected to the generator for counting the clock pulses in a plurality of digit stages, a second binary counter having fewer digit stages than the first counter, and data selector means responsive to overflow signals from the highest digit stage of the second counter for progressively connecting the second counter to the generator and successive digit stages of the first counter whereby the number in the second counter corresponds to selected higher digits of the number of clock pulses counted in the first counter;

a comparator circuit responsive to the pulse number modulated signal of successive bits for producing a discrimination signal and including a register for storing the number from the second counter for a preceding bit and comparator means connected to the second counter and the register and comparing the number for a succeeding bit in the second counter with the number for the preceding bit in the register for producing the discrimination signal, said comparator means comprising a third binary counter connected to the highest digit stage of the second counter for counting the overflow signals therefrom;

a downcounter connected to the third counter and storing the number therefrom for a preceding bit ($B_i$) and connected to be decremented with the overflow signals therefrom for providing a digit correction signal indicating the relative value of the numbers in the second counter and register; and a comparator responsive to the numbers in the second counter and the register and the digit correction signal from the downcounter for providing the discrimination signal; and a logic circuit responsive to the edge pulse signal and the discrimination signal for providing a demodulation signal for each of one of the "0" and "1" bits.

2. Apparatus for demodulating a pulse width modulated binary coded signal including bits arranged in successive bit intervals with adjacent bit intervals having a transition signal therebetween, a bit of one logical sense being represented by a transition signal during its bit interval and a bit of complementary logical sense being represented by the absence of a transition signal during its bit interval, said apparatus comprising:

a source of clock pulses at a frequency substantially higher than the maximum expected frequency of said binary coded signal;

counter means for counting the number of clock pulses generated during a present bit interval so as to provide a count representing the instantaneous duration of said bit interval;

storage means coupled to said counter means for storing the count representing the duration of the immediately preceding bit interval;

comparator means for comparing the count in said counter means as said count is changing with said stored count to produce a gating pulse commencing when said instantaneous count is within a lower limit of a predetermined range of said stored count and terminating when said instantaneous count reaches an upper limit of said predetermined range;

gate means enabled by said gating pulse to detect a transition signal in said binary coded signal occurring only during a central portion of a bit interval; and output means coupled to said gate means and responsive to said detected transition signals for producing binary 1's and 0's as represented by said pulse width modulated binary coded signal.

3. The apparatus of claim 2 wherein said counter means comprises a counting stage; variable dividing means having a plurality of frequency divider ratios for receiving said clock pulses and for providing different frequency-divided clock pulses in response thereto; and selector means for selecting said frequency divider ratios in accordance with the count reached by said counting stage so as to supply said clock pulses to said counting stage at a selected divided frequency.

4. The apparatus of claim 3 further comprising wave forming means connected to receive said pulse width modulated binary coded signal and to generate a pulse signal in response to each transition signal; means for deriving the complement of said gating pulse; and means enabled by said complement of said gating pulse to detect only those pulse signals corresponding to transition signals defining bit intervals for resetting said counting stage at the completion of each bit interval.

5. The apparatus of claim 4 wherein said counting stage comprises first and second counting sections, said first counting section accumulating counts of a relatively lesser significance and said second counting section being responsive to overflow signals from said first counting stage to accumulate counts of relatively more significance; and means for applying the count of said second counting section to said selector means for selecting said frequency divider ratio; and wherein said means having a plurality of frequency divider ratios comprises second counter means having a plurality of stages, each stage being connected to a respective input of said selector means.

6. The apparatus of claim 5 wherein said selector means comprises switching means having individual inputs connected to said stages of said second counter means, an output selectively connected to one of said inputs for supplying divided clock pulses to said first counting section, and a control input coupled to the output of said second counting section for selecting which input is to be connected to the output thereof.

7. The apparatus of claim 5 wherein said storage means comprises a storage register coupled to said first counting section for receiving the count reached by said first counting section at the completion of each bit interval; downcounter means coupled to said second counting section for receiving the count reached by said second counting section at the completion of each bit interval; and means for decrementing said downcounter means in response to each overflow signal from said first counting stage during a present bit interval; the count of said first counting stage being compared to the count in said storage register by said comparator means, and the count in said downcounter means being supplied to said comparator means to provide a digit correction signal indicating the relative values of said compared counts.

8. The apparatus of claim 7 wherein said output means comprises a flip-flop circuit connected to be set to a binary 1 representing state in response to said detected transition signal and to be reset to a binary 0 representing state in response to each detected pulse signal corresponding to a transition signal defining a bit interval.

9. The apparatus of claim 4 wherein said lower limit of said predetermined range of said stored count is about 25% and said upper limit is about 75%.

10. The apparatus of claim 4 wherein said lower limit of said predetermined range of said stored count is between 25% and 50%.

11. In a video tape recorder/reproducer having a reproducing head for detecting "0" and "1" bits of a binary coded pulse width modulated signal recorded on the tape, for example to identify frames of video signals also recorded on the tape, the pulse width modulated signal having a level transition at the beginning of every bit interval and a second level transition in a central portion of a bit interval which is coded to represent a "1", apparatus for demodulating the "0" and "1" bits of the pulse width modulated binary coded signal comprising wave former means for receiving said binary coded signal to produce edge pulse signals for every level transition in the pulse width modulated signal; gate means enabled by a gating signal and responsive to said edge pulse signals for providing reset signals corresponding to the beginning of every bit interval, and for providing delayed latching signals; clock pulse generator means for generating clock pulses; first binary counter means having a plurality of digit stages all reset to "0" by said reset signals for counting said clock pulses to quantize the pulse width of each bit; second binary counter means having fewer digit stages than said first counter means, the stages of said second counter means also being reset to "0" by said reset signals; data selector means responsive to the count of said second counter means for progressively connecting said second counter means to successive digit stages of said first counter means, whereby the count in said second counter means corresponds to selected higher digits of the count of clock pulses in said first counter means and represents the pulse width of a bit interval; comparator means for comparing the count being accumulated in said second counter means during a present bit interval with the count reached by said second counter means at the end of the immediately preceding bit interval for providing a discrimination signal of one level only when the count in said second counter means during the present bit interval is within a predetermined range of the count reached by said second counter means at the end of the immediately preceding bit interval and of another level when the count in said second counter means during the present bit interval is outside said range; and output gate means responsive to said edge pulse signals and enabled by said discrimination signal for providing a demodulated signal corresponding only to the "1" bits of the pulse width modulated signal.

* * * * *